United States Patent [19]

Yazaki et al.

[11] Patent Number: 4,511,610
[45] Date of Patent: Apr. 16, 1985

[54] MULTI-LAYER DRAWN PLASTIC VESSEL

[75] Inventors: Jinichi Yazaki, Tokyo; Kozaburo Sakano, Kawasaki, both of Japan

[73] Assignee: Toyo Seikan Kaisha Ltd., Tokyo, Japan

[21] Appl. No.: 536,846

[22] Filed: Sep. 29, 1983

[30] Foreign Application Priority Data

Oct. 14, 1982 [JP] Japan ................................. 57-179051
Nov. 2, 1982 [JP] Japan ................................. 57-191809

[51] Int. Cl.$^3$ ..................... B65D 85/00; B32B 27/08
[52] U.S. Cl. ..................................... 428/35; 428/516; 428/910
[58] Field of Search ............... 428/516, 517, 518, 519, 428/35, 910

[56] References Cited

FOREIGN PATENT DOCUMENTS 63484  6/1978  Japan ................................... 428/516
65350  6/1978  Japan ................................... 428/516
19718  2/1981  Japan ................................... 428/516

Primary Examiner—George F. Lesmes
Assistant Examiner—Beverly Johnson
Attorney, Agent, or Firm—Sherman & Shalloway

[57] ABSTRACT

Disclosed is a multi-layer drawn plastic vessel comprising at least one layer composed mainly of at least one crystalline olefin resin selected from crystalline polypropylene and crystalline propylene/ethylene copolymers having an ethylene content of 1 to 20 mole %, at least one oxygen-barrier layer composed mainly of an ethylene/vinyl alcohol copolymer having an ethylene content of 25 to 60 mole %, and an adhesive resin layer interposed between said two resin layers, said adhesive resin layer containing an acid- or acid anhydride-modified, linear, low-density polyethylene or a mixture of said polyethylene with an acid- or acid anhydride-modified propylene resin and said crystalline olefin resin layer being molecularly oriented in at least one direction.

8 Claims, No Drawings

MULTI-LAYER DRAWN PLASTIC VESSEL

BACKGROUND OF THE INVENTION (1) Field of the Invention

The present invention relates to a multi-layer drawn plastic vessel. More particularly, the present invention relates to a multi-layer drawn plastic vessel comprising a laminate having a propylene resin layer and an oxygen-barrier layer formed of an ethylene/vinyl alcohol copolymer, in which the adhesion strength between both the resin layers is prominently improved even though the propylene resin layer is molecularly oriented.

(2) Description of the Prior Art

A laminate formed by bonding a layer of an olefin resin excellent in the moisture resistance, such as polypropylene or polyethylene, to a layer of an ethylene/vinyl alcohol copolymer excellent in the oxygen barrier property through an adhesive layer composed of an acid- or acid anhydride-modified olefin resin is used in various fields as a vessel having an excellent content-preserving quality in the form of a bottle, cup or pouch.

In order to reduce the thickness of the vessel wall as much as possible, improve the rigidity, impact resistance and other mechanical properties of the vessel wall and also improve the transparency and gas barrier property, it is preferred that this multi-layer plastic material be molecularly oriented in at least one direction. Furthermore, plastic processing such as draw forming or biaxial draw-blow forming is advantageous over heat processing because the heat energy cost is low and the productivity is ordinarily high, and by this plastic processing, molecular orientation is naturally caused in the formed vessel wall.

A conventional laminate formed by using an acid- or acid anhydride-modified olefin resin as an adhesive layer has an excellent adhesion strength (peel strength) in the undrawn state, but with increase of the degree of the molecular orientation by drawing, the adhesion strength is gradually reduced and interlaminar peeling is observed in the as-prepared vessel or is readily caused by slight falling shocks. This tendency is especially prominent when polypropylene which is excellent over polyethylene in the rigidity and mechanical strength is used as the olefin resin for outer and inner layers and this polypropylene is oriented by drawing.

Various proposals have heretofore been made in connection with means for controlling reduction of the adhesion strength of a laminate as mentioned above at the draw-forming step. For example, Japanese Patent Publication No. 11585/81 proposes a method in which a blend of an acid- or acid anhydride-modified olefin polymer and a crystalline ethylene copolymer is used as an adhesive layer interposed between the polypropylene layer and the ethylene/vinyl alcohol copolymer layer and a crystalline ethylene copolymer having a melting point lower by 40° to 110° C. than the melting point of the polypropylene is used as the ethylene copolymer contained in the blend. According to this proposal, the interlaminar peeling resistance is improved, but if the polypropylene layer is highly molecularly oriented, it is impossible to prevent the interlaminar peeling completely.

SUMMARY OF THE INVENTION

It is therefore a primary object of the present invention to provide a multi-layer drawn plastic vessel comprising a layer composed of at least one member selected from crystalline polypropylene and crystalline propylene/ethylene copolymers, a layer composed of an ethylene/vinyl alcohol copolymer, said two layers being bonded to each other through a layer containing an acid- or acid anhydride-modified, linear, low-density polyethylene, in which the interlaminar peeling resistance is highly improved and the degree of molecular orientation of the vessel wall is increased.

Another object of the present invention is to provide a multi-layer drawn plastic vessel comprising a layer composed of at least one member selected from crystalline polypropylene and crystalline propylene/ethylene copolymers and a layer composed of an ethylene/vinyl alcohol copolymer, said two layers being bonded to each other through an adhesive layer composed of an acid- or acid anhydride-modified olefin resin composition, in which the drawing temperature for the propylene resin layer is matched with the melting characteristics of the adhesive layer, whereby the interlaminar peeling resistance is highly improved and the degree of molecular orientation of the vessel wall is increased.

Still another object of the present invention is to provide a multi-layer drawn plastic vessel which comprises constituent resin layers excellent in the interlaminar peeling resistance though the vessel is prepared through plastic processing such as biaxial draw-blow forming or draw processing.

A further object of the present invention is to provide a biaxially drawn, blow-molded vessel.

A still further object of the present invention is to provide a seamless plastic vessel prepared by draw forming.

A still further object of the present invention is to provide a multi-layer drawn plastic vessel which is excellent in the adaptability to the forming operation and the productivity.

In accordance with one fundamental aspect of the present invention, there is provided a multi-layer drawn plastic vessel comprising at least one layer composed mainly of at least one crystalline olefin resin selected from crystalline polypropylene and crystalline propylene/ethylene copolymers having an ethylene content of 1 to 20 mole %, at least one oxygen-barrier layer composed mainly of an ethylene/vinyl alcohol copolymer having an ethylene content of 25 to 60 mole %, and an adhesive resin layer interposed between said two resin layers, said adhesive resin layer containing an acid- or acid anhydride-modified, linear, low-density polyethylene and said crystalline olefin resin layer being molecularly oriented in at least one direction.

In accordance with one preferred embodiment of the present invention, there is provided a multi-layer drawn plastic vessel comprising at least one layer composed mainly of at least one crystalline olefin resin selected from crystalline polypropylene and crystalline propylene/ethylene copolymers having an ethylene content of 1 to 20 mole %, at least one oxygen-barrier layer composed mainly of an ethylene/vinyl alcohol copolymer having an ethylene content of 25 to 60 mole %, and an ahesive layer interposed between said two resin layers, said adhesive layer being composed of a composition comprising an acid- or acid anhydride-modified, linear, low-density polyethylene and an acid- or acid anhydride-modified propylene resin at a weight ratio of from 95/5 to 50/50 and said crystalline olefin resin layer being molecularly oriented in at least one direction.

DETAILED DESCRIPTION OF THE PREFERRED EMBODIMENTS

The present invention is characterized in that among various acid- and acid anhydride-modified olefin resins, an acid- or acid anhydride-modified resin based on linear low-density polyethylene or a resin composition comprising this modified resin and an acid- or acid anhydride-modified propylene resin is especially selected and is used as the adhesive resin layer.

Linear low-density polyethylene used as the base of the acid- or acid anhydride-modified resin has several characteristics not possessed by ordinary high-pressure method low-density polyethylene or low-pressure method high-density polyethylene.

For example, although high-pressure method low-density polyethylene is a homopolymer of ethylene having a molecular structure having long-chain branches, linear low-density polyethylene has a substantially linear molecular structure and consists of a copolymer of ethylene with an α-olefin having 4 to 8 carbon atoms. On the other hand, low-pressure method high density polyethylene has a density of 0.940 to 0.965 g/cm$^3$ (as measured at 25° C.) and its molecular structure is substantially free of short branches, but linear low-density polyethylene has a density of 0.915 to 0.935 g/cm$^3$ and its molecular structure has short branches derived from the above-mentioned α-olefin.

As the comonomer in this linear low-density polyethylene, there can be mentioned α-olefins having 4 to 8 carbon atoms, such as butene-1, pentene-1,4-methylpentene-1, hexene-1,2-methylbutene-1 and octene-1. The α-olefin is included in the polymer chain in an amount of 1 to 20 % by weight, especially 3 to 15% by weight, based on the total polymer.

Because of the above-mentioned differences of the chemical structure, linear low-density polyethylene (L-LDPE) has physical properties different from those of other olefin resins such as high-pressure method low-density polyethylene (HP-LDPE), high-density polyethylene (HDPE) and a crystalline propylene-/ethylene copolymer (PPE), as shown in Table A given below.

TABLE A

| Resin | Elongation (%) | Strength (Kg/cm$^2$) | Melting Point (°C.) |
|---|---|---|---|
| L-LDPE | 850 | 300 | 106–122 |
| HP-LDPE | 600 | 120 | 94–114 |
| HDPE | 800 | 230 | 118–133 |
| PPE | 800 | 330 | 125–153 |

From the data shown in Table A, it will readily be understood that linear low density polyethylene to be used as the base of the modified resin has a low melting point while it has high elongation and strength.

The modified resin used in the present invention is easily obtained by graft-modifying the above-mentioned linear low-density polyethylene with an ethylenically unsaturated carboxylic acid or an anhydride thereof. As the ethylenically unsaturated carboxylic acid or its anhydride, there can be mentioned maleic anhydride, maleic acid, fumaric acid, acrylic acid, methacrylic acid, crotonic acid, itaconic acid, citraconic acid and hexahydrophthalic anhydride. Carbonyl groups

derived from the acid or acid anhydride can be contained at a concentration of 1 to 600 milliequivalents, especially 5 to 400 milliequivalents, per 100 g of the polymer based on the final resin.

It is ordinarily preferred that the modified polyethylene should have a melting point of 115° to 135° C.

The adhesive layer used in the present invention may be composed of an acid-modified linear low-density polyethylene alone or a blend of an acid-modified linear low-density polyethylene and an unmodified linear low-density polyethylene. In the latter case, the blending ratio of both the resins may optionally be changed, so far as the carbonyl group concentration in the blend is within the above-mentioned range. Moreover, this adhesive layer may be composed of a blend of linear low-density polyethylene and other olefin resin such as acid-modified or unmodified crystalline polypropylene, high-density polyethylene, high-pressure method low-density polyethylene or a crystalline ethylene/propylene copolymer, so far as the linear low-density polyethylene content is at least 50% by weight and the carbonyl group concentration in the blend is within the above-mentioned range.

According to the present invention, by using the adhesive layer composed mainly of an acid- or acid anhydride-modified linear low-density polyethylene, even if a laminate structure comprising a polypropylene layer and an ethylene/vinyl alcohol copolymer layer is highly drawn, the peel strength of the laminate is highly improved. Ordinarily, when a laminate of this type is drawn, peeling is not caused between the propylene resin layer and the adhesive resin layer but peeling is caused between the adhesive layer and the ethylene/vinyl alcohol copolymer layer. Table B given below shows data of the peel strength (Kg/15 mm width) obtained when a laminate sheet of a maleic anhydride-modified olefin resin having a carbonyl group concentration of 94 milliequivalents (meq) per 100 g of the polymer and an ethylene/vinyl alcohol copolymer having an ethylene content of 40 mole % was drawn at 150° C. at various draw ratios.

TABLE B

| Base of Modified Resin | Draw Ratio | | | |
|---|---|---|---|---|
| | 0 | 3 | 5 | 10 |
| L-LDPE | above 4 | 1 | 1 | 0.4 |
| HP-LDPE | above 4 | 0.3 | 0–0.02 | 0–0.02 |
| HDPE | above 4 | 1 | 0.4 | 0.05 |
| PPE | above 4 | 0.5 | 0–0.02 | 0–0.02 |

From the data shown in Table B, it will readily be understood that in the case where any acid-modified olefin resin is used, a high adhesion strength is obtained in the undrawn state, but if the draw ratio is increased, the adhesion strength is drastically reduced but when an acid-modified resin derived from L-LDPE as the base is used, an excellent adhesion strength is obtained within a practical draw ratio range.

The reasons why an excellent interlaminar adhesion strength can be obtained even at a high draw ratio when an acid- or acid anhydride-modified linear low-density polyethylene is used as the adhesive resin layer according to the present invention are considered to be as follows.

This specific adhesive resin layer is present in the molten state under the propylene-drawing conditions and has such a property that this melt is well elongated even under a relatively low tension.

Table C shows data of the elongation and tension obtained at 160° C. with reference to melts of acid-modified resins derived from various olefin resin bases.

TABLE C

| Base Resin | Elongation (%) | Tension (g) |
| --- | --- | --- |
| L-LDPE | 280 | 8.7 |
| HP-LDPE | 60 | 15.8 |
| HDPE | 250 | 10.5 |
| PPE | 200 | 11.5 |

From the data shown in Table C, it will readily be understood that the modified resin based on linear low-density polyethylene has such a property that the resin is well elongated in the molten state under a relatively low tension, and it is considered that by dint of this characteristic property, in the laminated vessel of the present invention, the fracture of the bonded interface at the draw-forming step or the presence of the residual strain in the bonded interface is prevented and an excellent adhesion strength is maintained even at a high draw ratio. Moreover, it is believed that the fact that this adhesive resin per se has an excellent mechanical strength in the normal state is contributory to the increase of the adhesion strength. Incidentally, it must be noted that the physical properties are not substantially changed by the acid modification included within the above-mentioned range.

The acid- or acid anhydride-modified linear low-density polyethylene used in the present invention has a low melt tension in the range of from 5 to 9 g as measured at 170° C. by a melt tension tester (nozzle length L=8 mm, nozzle diameter=2.1 mm, extrusion speed=10 mm/min).

In accordance with one preferred embodiment of the present invention, there is provided a resin composition comprising (A) an acid-modified, linear, low-density polyethylene and (B) an acid-modified propylene resin at an (A)/(B) weight ratio of from 95/5 to 50/50, especially from 90/10 to 60/40.

As is apparent from the data shown in Table B given hereinbefore, the acid-modified linear low density polyethylene is advantageous in that it gives a high interlaminar adhesion strength even at a high draw ratio, but under high draw ratio conditions adopted for drawing crystalline propylene or a crystalline propylene/ethylene copolymer, a thick portion and a thin portion are formed in the adhesive layer of this acid-modified linear low-density polyethylene and the thickness becomes uneven, and fusion fracture of the adhesive layer is caused in an extreme case and a portion having a very small adhesive force is locally formed in the drawn structure.

From the results of researches made by us, it is construed that since the linear low-density polyethylene has a low melting point among various olefin resins and it has a considerably small melt tension, flowing or fusion fracture rendering the thickness uneven is readily caused under the conditions for drawing the crystalline propylene resin layer.

As shown in Table C given hereinbefore, the acid-modified linear low-density polyethylene has a small melt tension. This defect results in the following disadvantage. Namely, at the step of preparing a pipe-like multi-layer parison or preform by extrusion or at the step of preheating the parison or preform for the drawing operation, it sometimes happens that the inner layer portion is thrown clear from the outer layer portion of the parison and the adaptability to the forming operation is considerably reduced.

According to the above-mentioned preferred embodiment of the present invention, by incorporating an acid-modified propylene resin into this acid-modified linear low-density polyethylene, non-uniformalization of the thickness (thickness unevenness) of the adhesive layer under drawing conditions or fusion fracture of the adhesive layer can be prevented while maintaining a high interlaminar adhesion strength even at a high draw ratio, and reduction of the operation adaptability due to a low melt tension is moderated.

In this preferred embodiment of the present invention, if the amount incorporated of the acid-modified propylene resin is too large and exceeds the above range, reduction of the adhesive force under drawing conditions tends to be prominent, and if the amount of the acid-modified propylene resin is too small and below the above range, troubles are caused because of the unevenness of the adhesive layer.

The reason why the acid-modified propylene resin used as the other modified resin component exerts the above-mentioned function has not been elucidated. However, it is believed that since the acid-modified propylene resin has an excellent compatibility with the acid-modified linear low density polyethylene and inhibits melt flowing of the acid-modified linear low-density polyethylene, the acid-modified propylene resin will probably exert the above function.

The acid-modified propylene resin to be used in the present invention is prepared by modifying crystalline polypropylene or a crystalline propylene/ethylene copolymer having an ethylene content of 1 to 20 mole % with an ethylenically unsaturated carboxylic acid or an anhydride thereof as in case of the linear low-density polyethylene, and the acid-modified propylene resin contains carbonyl groups derived from the acid or anhydride at a concentration of 1 to 600 meq/100 g of the polymer, especially 5 to 400 meq/100 g of the polymer.

It is preferred that the melting point of the modified propylene resin be 148° to 167° C., especially lower than the temperature adopted for drawing the multi-layer structure, though the preferred melting point varies to some extent according to the ethylene content.

In view of the rigidity, mechanical strength and transparency, it is important that crystalline polypropylene or a crystalline propylene/ethylene copolymer having an ethylene content of 1 to 20 mole % should be used as the olefin resin layer in the multi-layer vessel of the present invention. In the present invention, even if this crystalline polypropylene or propylene/ethylene copolymer is used, an excellent interlaminar peeling resistance can be attained. This is one of advantages attained by the present invention.

A layer comprising the above-mentioned crystalline polypropylene or propylene/ethylene copolymer and a small amount of the resin constituting the oxygen barrier layer or adhesive layer may be used as the layer composed mainly of the olefin resin. Accordingly, burrs or fins formed at the blow molding step may be used as the olefin resin layer or a part thereof.

In view of the oxygen-barrier property, a copolymer obtained by saponifying an ethylene/vinyl acetate copolymer having an ethylene content of 25 to 60 mole % to a saponification degree of at least 96%, especially at least 99%, is preferably used as the ethylene/vinyl alcohol copolymer in the multi-layer vessel of the present invention. Of course, other thermoplastic resin may be incorporated in the oxygen-barrier layer, so far as the characteristic properties of the ethylene/vinyl alcohol copolymer are not impaired.

In the present invention, an optional layer arrangement can be adopted, so far as the adhesive layer (C) is interposed between the oxygen-barrier layer (A) and the olefin resin layer (B). For example, the following layer arrangements may be adopted.
(1) Three-layer structure of (A)/(C)/(B).
(2) Four-layer structure of (C)/(A)/(C)/(B).
(3) Five-layer structures of (B)/(C)/(A)/(C)/(B), (B)/(C)/(A)/(C)/(B') and (B+A+C)/(A)/(C)/(B+A+C).
(4) Six-layer structures of (B)/(B')/(C)/(A)/(C)/(B) and (B)/(B+A+C)/(C)/(A)/(C)/(B).
(5) Seven-layer structures of (B)/(B+A+C)/(C)/(A)/(C)/(B+A+C)/(B) and (B)/(B')/(C)/(A)/(C)/(B')/(B).

The thickness of each layer is not particularly critical in the multi-layer vessel. However, it is ordinarily preferred that the (B)/(A) thickness ratio be in the range of from 1/1 to 500/1 and the (B)/(C) thickness ratio be in the range of from 1/1 to 500/1.

According to the present invention, a parison or sheet having the above-mentioned multi-layer structure is formed by co-melt extrusion, and this parison or sheet is formed into a vessel by known plastic forming means.

A multi-layer parison is prepared by co-melt extrusion or simultaneous injection molding of the above-mentioned resin layers, and a biaxially drawn blow-molded vessel can be obtained by drawing this parison in the axial direction and simultaneously or sequentially inflating the parison in the transverse direction by a fluid.

A multi-layer sheet is obtained by forming the above-mentioned resin layers into a sheet according to the T-die method, the inflation method or the like, and a seamless cup-shaped drawn vessel can be obtained by molding this sheet by plug-assist forming, draw forming using a die and punch, air-pressure forming draw-iron forming.

In the present invention, in order to improve the rigidity, mechanical strength and transparency of the vessel, it is important that the olefin resin layer should be oriented by drawing. This orientation can easily be accomplished by carrying out biaxial draw-blow forming of the parison or draw forming of the sheet at a temperature just below the melting point of the olefin resin or slightly lower than the melting point of the olefin resin. In the present invention, if the above-mentioned adhesive layer (C) is used, forming can be performed at a temperature higher than the melting point of the adhesive layer while imparting effective orientation to the olefin resin layer, and therefore, it becomes possible to improve the interlaminar peeling resistance between the respective resin layers and the impact resistance while highly improving the rigidity, mechanical strength, gas barrier property and transparency of the vessel.

In the present invention, if draw forming is carried out under the above-mentioned conditions, a multi-layer drawn vessel having highly improved transparency, rigidity and gas barrier property and an especially high interlaminar peeling resistance can be obtained. Furthermore, by this drawing operation, the thickness of the vessel can be reduced, the weight can be reduced and the amount used of the resins can be decreased. In case of a biaixally drawn and blown vessel, the draw ratio can be 1.5 to 5 in the axial direction and 2 to 10 in the circumferential direction, and biaxial molecular orientation can be given to the vessel. In case of a drawn vessel such as a cup, the contraction ratio, that is, the ratio of the vessel height to the mouth diameter, can be 0.2 to 5, and molecular orientation is given in the axial direction.

In the formed vessel of the present invention, the basis weight (the volume per g of the resin) is ordinarily 0.01 to 5 dl/g and especially 0.05 to 2 dl/g, though the basis weight varies to some extent according to the intended use. The thickness of the vessel wall is ordinarily 0.02 to 1 mm and especially 0.08 to 0.8 mm. If the basis weight and thickness are arranged within these ranges, a desirable combination of the gas barrier property, rigidity and transparency can be attained.

The vessel of the present invention is valuable as a vessel for preserving the content as it is or after it has been subjected to such a treatment as hot filling or heat sterilization. Namely, the vessel of the present invention is valuable as a vessel for preserving with much reduced deterioration or weight decrease liquid or pasty foods or drinks, for example, alcoholic drinks such as carbonated alcoholic drinks, e.g., beer, Japanese sake, whisky, low-class distilled spirits, ratafia, e.g., wine and cocktails, e.g., gin fizz, carbonated drinks such as cola, cider and plain soda, straigh juices such as lemon juice, orange juice, plum juice, grape juice and strawberry juice, fruit juice-containing processed drinks such as Nector juice, vegetable drinks such as tomato juice and other vegetable juices, synthetic drinks or vitamin-added drinks such as synthetic fruit juices comprising saccharide such as sugar or fructose, citric acid, a colorant and a perfume, optionally with vitamins, lactic acid beverages, stews such as cooked curry, cooked hash, borsch and beef stew, gravies such as meat sauce, boiled vegetables, fishes and meats such as sweet-and-sour port, sukiyaki, Chinese hoosh and hotchpotch, boiled asparagus, boiled beans and cream-boiled tuna, soups such as consomme, potage, miso soup, pork-mixed miso soup and chowder, rice foods such as boiled rice, cooked rice with red beans, fried rice, pilaf and rice gruel, noodles such as spagetti, buckwheat vermicelli, wheat vermicelli, Chinese noodles and macaroni, composite seasonings for fried rice soups or Chinese noddle soups, table luxuries such as boiled red beans, boiled peas with honey and bean jam, custard pudding, jelly and soft bean jelly, processed marine products and livestock products such as meat dumpling, hamburger, corned beef, sausage, roast fish, smoked fish, bacon and boiled fish paste, fruits such as orange, pineapple, peach, cherry and olive, seasonings such as soy sauce, sauce, vinegar, dressing, mayonaise and ketchup, and other subsidiary foods such as bean curd, jam, butter and margarin; medicines such as Ringer's solution, agricultural chemicals, cosmetics and detergents; ketones such as acetone and methylethyl ketone, aliphatic hydrocarbons such as n-hexane and n-heptane, alicyclic hydrocarbons such as cyclohexane, aromatic hydrocarbons benzene, toluene and xylene; chlorine-containing compounds such as carbon tetrachloride, tetrachloroethane and tetrachloroethylene, high fatty acids; gasolin, kerosene, petroleum, benzine, heavy oil, thinner, grease, silicon oil, light oil and machine oil; and liquefied Freon (the tradename for the product supplied by Ro Pont).

The present invention will now be described in detail with reference to the following Examples that by no means limit the scope of the invention.

EXAMPLE 1

For the production of a bottle having a five-layer structure of outer layer/adhesive layer/intermediate layer/adhesive layer/inner layer, a bottomless multilayer pipe having a five-layer structure was formed by using an extruder having a diameter of 40 mm, an effective length of 880 mm and one melt channel (for the intermedate layer), an extruder having a diameter of 40 mm, an effective length of 880 mm and two melt channels (for the adhesive layers), an extruder having a diameter of 65 mm, an effective length of 1430 mm and two melt channels (for the inner and outer layers), and a co-extrusion 5-ply die. An ethylene/propylene copolymer having a melt index of 2.0 g/10 min, a density of 0.89 g/cc and a melting point of 158° C. as determined by the DTA method (the temperature elevation rate was 10° C./min) was used as the inner and outer layers. An ethylene/vinyl alcohol copolymer having an ethylene content of 42 mole %, a vinyl alcohol content of 58 mole % and a melting point of 163° C. as determined according to the above-mentioned method was used as the oxygen-barrier layer (intermediate layer). As the adhesive layer resin, there was used (1) a modified linear low-density polyethylene having a melt index of 0.4 g/10 min, a density of 0.93 g/cc, a melting point of 122° C. as determined by the above-mentioned method and a carbonyl group concentration of 94 meq/100 g of the polymer or (2) a mixture comprising the above-mentioned modified linear low-density polyethylene and an unmodified linear low-density polyethylene at a weight ratio of 90/10.

The outer layer/adhesive layer/intermediate layer/adhesive layer/inner layer thickness ratio in the formed pipe was 1:1/200:1/5:1/200:1.

The entire thickness of the pipe was about 10 mm, and the inner diameter was 30 mm and the length was 30 mm. The pipe formed by using the adhesive resin (1) is designated as "pipe A" and the pipe formed by using tthe adhesive resin (2) is designated as "pipe B".

Each pipe was heated for 25 minutes in an atmosphere maintained at 154±1° C., and the pipe was drawn in the longitudinal direction at a draw ratio of about 3 by pinching both the ends of the pipe by clamps, and the drawn pipe was inserted in a blowing mold and air was blown into the so-formed parison from one end thereof to inflate the parison in the transverse direction and effect blow forming. Thus, biaxially drawn blow-flowed bottles AB and BB having the above-mentioned 5-layer structure were obtained. Each bottle had an inner diameter of 100 mm and a height of 150 mm, and the average wall thickness was 0.6 mm, the inner capacity was about 1000 cc and the basis weight was about 0.31 dl/g. Each bottle had a cylindrical shape.

With respect to each bottle, the oxygen permeability ($QO_2$) was measured according to the method disclosed in Japanese Patent Publication No. 11263/77 and the haze (Hz) was measured according to the method of JIS K-6714. Twenty samples each of the bottles AB and BB were filled with 1000 cc of water and they were let to fall down on a concrete floor from a height of 120 cm at normal temperature. The presence or absence of interlaminar peeling in the bottom, bottom corner, barrel and mouth was visually checked by a panel of 5 experts to evaluate the interlaminar peeling resistance.

For comparison, a bottle CB was prepared in the same manner as described above except that low density polyethylene having a carbonyl group concentration of 94 meq/100 g of the polymer and a melting point of 110° C. was used as the adhesive resin.

The results of evaluation of these bottles are shown in Table 1. The bottles AB, BB and CB were not substantially different from one another in the oxygen permeability, but the bottles AB and BB were excellent over the bottle CB in the haze and interlaminar peeling resistance.

TABLE 1

| Bottle | Oxygen Permeability (cc/m$^2$ · day · atm) | Haze (%) | Interlaminar Peeling (%) |
| --- | --- | --- | --- |
| AB | 4.2 | 10.8 | 0.0 |
| BB | 4.1 | 10.2 | 1.0 |
| CB | 4.3 | 17.6 | 75.0 |

EXAMPLE 2

A 5-layer sheet (0.8 mm in thickness) in which the outer layer/adhesive layer/oxygen-barrier layer (intermediate layer)/adhesive layer/inner layer thickness ratio was 1:1/50:1/20:1/50:1 was formed by using a 5-ply T-die and a sheet forming machine. An isotactic propylene homopolymer having a melt index of 0.5 g/10 min (as measured according to the method of ASTM D-1238; the same will apply hereinafter), a density of 0.91 g/cc (as measured according to the method of ASTM D-1505; the same will apply hereinafter) and a melting point of 165° C. as determined according to the DTA method (the temperature elevation rate was 10° C./min) was used as the inner and outer layers, an ethylene/vinyl alcohol copolymer having an ethylene content of 30 mole %, a vinyl alcohol content of 70 mole % and a melting point of 183° C. was used as the oxygen-barrier layer (hereinafter referred to as "intermediate layer"), and a modified linear low-density polyethylene having a melt index of 2.0 g/10 min, a density of 0.93 g/cc, a melting point of 122° C. and a carbonyl group concentration of 94 meq/100 g of the polymer was used as the adhesive layer resin. This laminated sheet was uniformly heated at 162° C. and was formed into an angular cup (cup DC) having a length of 140 mm, a width of 100 mm, a height of 40 mm, a side wall thickness of 0.4 mm and an inner capacity of 500 cc according to the known plug-assist air-pressure forming method.

For comparison, a laminated cup (cup EC) was prepared in the same manner as described above except that a modified propylene polymer having a melting point of 163° C. and a carbonyl group concentration of 48 meq/100 g of the polymer was used as the adhesive layer resin.

These cups were evaluated in the same manner as described in Example 1. The obtained results are shown in Table 2.

TABLE 2

| Cup | Oxygen Permeability (cc/m$^2$ · day · atm) | Haze (%) | Interlaminar Peeling (%) |
| --- | --- | --- | --- |
| DC | 7.8 | 9.8 | 0.0 |
| EC | 7.9 | 10.7 | 5.0 (corner |

TABLE 2-continued

| Cup | Oxygen Permeability (cc/m² · day · atm) | Haze (%) | Interlaminar Peeling (%) |
| --- | --- | --- | --- |
| | | | portions) |

EXAMPLE 3

For the production of a bottle having a five-layer structure of outer layer/adhesive layer/intermediate layer/adhesive layer/inner layer, a bottomless multilayer pipe having a five-layer structure was formed by using an extruder having a diameter of 40 mm, an effective length of 880 mm and one melt channel (for the intermediate layer), an extruder having a diameter of 40 mm, an effective length of 880 mm and two melt channels (for the adhesive layers), an extruder having a diameter of 65 mm, an effective length of 1430 mm and two melt channels (for the inner and outer layers), and a co-extrusion 5-ply die. An ethylene/propylene copolymer having a melt index of 2.0 g/10 min, a density of 0.89 g/cc and a melting point of 158° C. as determined by the DTA method (the temperature elevation rate was 10° C./min) was used as the inner and outer layers. An ethylene/vinyl alcohol copolymer having an ethylene content of 42 mole %, a vinyl alcohol content of 58 mole % and a melting point of 163° C. as determined according to the above-mentioned method was used as the oxygen-barrier layer (intermediate layer). As the adhesive layer resin, there was used a mixture comprising 80 parts by weight of a modified linear low-density polyethylene having a melt index of 0.4 g/10 min, a density of 0.93 g/cc, a melting point of 122° C. as determined by the above-mentioned method and a carbonyl group concentration of 94 meq/100 g of the polymer and 20 parts by weight of a modified ethylene/propylene copolymer having an ethylene content of 3 mole %, a melting point of 155° C. and a carbonyl group concentration of 65 meq/100 g of the polymer.

The outer layer/adhesive layer/intermediate layer/adhesive layer/inner layer thickness ratio in the formed pipe was 1:1/200:1/5:1/200:1.

The entire thickness of the pipe was about 6 mm, and the inner diameter was 30 mm and the length was 30 mm.

The pipe was heated for 25 minutes in an atmosphere maintained at 154±1° C., and the pipe was drawn in the longitudinal direction at a draw ratio of about 3 by pinching both the ends of the pipe by clamps, and the drawn pipe was inserted in a blowing mold and air was blown into the so-formed parison from one end thereof to inflate the parison in the transverse direction and effect blow forming. Thus, a biaxially drawn blow-formed bottle having the above-mentioned 5-layer structure was obtained. The bottle had an inner diameter of 100 mm and a height of 150 mm, and the average wall thickness was 0.6 mm, the inner capacity was about 1000 cc and the basis weight was about 0.31 dl/g. The bottle had a cylindrical shape.

With respect to the so-obtained bottle, the oxygen permeability ($QO_2$) was measured according to the method disclosed in Japanese Patent Publication No.11263/77 and the haze (Hz) was measured according to the method of JIS K-6714. Twenty samples of the bottle were filled with 1000 cc of water and they were let to fall down on a concrete floor from a height of 120 cm at normal temperature. The presence of absence of interlaminar peeling in the bottom, bottom corner, barrel and mouth was visually checked by a panel of 5 experts to evaluate the interlaminar peeling resistance.

For comparison, a bottle was prepared in the same manner as described described above except that a modified ethylene/propylene copolymer having a carbonyl group concentration of 94 meq/100 g of the polymer and a melting point of 155° C. was used as the adhesive resin.

The results of evaluation of these bottles are shown in Table 3. The bottles were not substantially different from each other in the oxygen permeability, but the bottle to the present invention was excellent over the comparative bottle in the haze and interlaminar peeling resistance.

TABLE 3

| Bottle | Oxygen Permeability (cc/m² · day · atm) | Haze (%) | Interlaminar Peeling (%) |
| --- | --- | --- | --- |
| present invention | 7.2 | 8.3 | 0.0 |
| comparison | 7.5 | 15.0 | 100 |

EXAMPLE 4

A 5-layer sheet (1.2 mm in thickness) in which the outer layer/adhesive layer/oxygen-barrier layer (intermediate layer)/adhesive layer/inner layer thickness ratio was 1:1/50:1/20:1/50:1 was formed by using a 5-ply T-die and a sheet forming machine. An isotactic propylene homopolymer having a melt index of 0.5 g/10 min (as measured according to the method of ASTM D-1238; the same will apply hereinafter), a density of 0.91 g/cc (as measured according to the method of ASTM D-1505; the same will apply hereinafter) and a melting point of 165° C. as determined according to the DTA method (the temperature elevation rate was 10° C./min) was used as the inner and outer layers, an ethylene/vinyl alcohol copolymer having an ethylene content of 30 mole %, a vinyl alcohol content of 70 mole % and a melting point of 183° C. was used as the oxygen-barrier layer (hereinafter referred to as "intermediate layer"), and a mixture comprising 60 parts by weight of a modified linear low-density polyethylene having a melt index of 2.0 g/10 min, a density of 0.93 g/cc, a melting point of 122° C. and a carbonyl group concentration of 94 meq/100 g of the polymer and 40 parts by weight of a modified ethylene/propylene copolymer having an ethylene content of 2 mole %, a melting point of 157° C. and a carbonyl group concentration of 70 meq/100 g of the polymer was used as the adhesive layer resin. This laminated sheet was uniformly heated at 160° C. and was formed into an angular cup having a length of 70 mm, a width of 70 mm, a height of 100 mm, a side wall thickness of 0.4 mm and an inner capacity of 500 cc according to the known plug-assist air-pressure forming method.

For comparison, a laminated cup was prepared in the same manner as described above except that a modified propylene polymer having a melting point of 157° C. and a carbonyl group concentration of 70 meq/100 g of the polymer was used as the adhesive layer resin.

These cups were evaluated in the same manner as described in Example 3. The obtained results are shown in Table 4.

TABLE 4

| Cup | Oxygen Permeability (cc/m² · day · atm) | Haze (%) | Interlaminar Peeling (%) |
| --- | --- | --- | --- |
| present invention | 7.8 | 9.8 | 0.0 |
| comparison | 7.9 | 10.7 | 33.0 (corner portions) |

EXAMPLE 5

For the production of a bottle having a five-layer structure of outer layer/adhesive layer/intermediate layer/adhesive layer/inner layer, a bottomless multi-layer pipe having a five-layer structure was formed by using an extruder having a diameter of 40 mm, an effective length of 880 mm and one melt channel (for the intermediate layer), an extruder having a diameter of 40 mm, an effective length of 880 mm and two melt channels (for the adhesive layers), an extruder having a diameter of 65 mm, an effective length of 1430 mm and two melt channels (for the inner and outer layers), and a co-extrusion 5-ply die. An ethylene/propylene copolymer having a melt index of 2.0 g/10 min, a density of 0.89 g/cc and a melting point of 158° C. as determined by the DTA method (the temperature elevation rate was 10° C./min) was used as the inner and outer layers. An ethylene/vinyl alcohol copolymer having an ethylene content of 42 mole %, a vinyl alcohol content of 58 mole % and a melting point of 163° C. as determined according to the above-mentioned method was used as the oxygen-barrier layer (intermediate layer). As the adhesive layer resin, there was used (1) a modified linear low-density polyethylene having a melt index of 0.5 g/10 min, a density of 0.93 g/cc, a melting point of 122° C. as determined by the above-mentioned method and a carbonyl group concentration of 5 meq/100 g of the polymer or (2) a mixture comprising the above-mentioned modified linear low-density polyethylene and an unmodified linear low-density polyethylene at a weight ratio of 90/10.

The outer layer/adhesive layer/intermediate layer/adhesive layer/inner layer thickness ratio in the formed pipe was 1:1/200:1/5:1/200:1.

The entire thickness of the pipe was about 10 mm, and the inner diameter was 30 mm and the length was 30 mm. The pipe formed by using the adhesive resin (1) is designated as "pipe F" and the pipe formed by using the adhesive resin (2) is designated as "pipe G".

Each pipe was heated for 25 minutes in an atmosphere maintained at 154±1° C., and the pipe was drawn in the longitudinal direction at a draw ratio of about 3 by pinching both the ends of the pipe by clamps, and the drawn pipe was inserted in a blowing mold and air was blown into the so-formed parison from one end thereof to inflate the parison in the transverse direction and effect blow forming. Thus, biaxially drawn blow-formed bottles FB and GB having the above-mentioned 5-layer structure were obtained. Each bottle had an inner diameter of 100 mm and a height of 150 mm, and the average wall thickness was 0.6 mm, the inner capacity was about 1000 cc and the basis weight was about 0.31 dl/g. Each bottle had a cylindrical shape.

With respect to each bottle, the oxygen permeability ($QO_2$) was measured according to the method disclosed in Japanese Patent Publication No. 11263/77 and the haze (Hz) was measured according to the method of JIS K-6714. Twenty samples each of the bottles FB and GB were filled with 1000 cc of water and they were let to fall down on a concrete floor from a height of 120 cm at normal temperature. The presence or absence of interlaminar peeling in the bottom, bottom corner, barrel and mouth was visually checked by a panel of 5 experts to evaluate the interlaminar peeling resistance.

For comparison, a bottle HB was prepared in the same manner as described above except that low density polyethylene having a carbonyl group concentration of 5 meq/100 g of the polymer and a melting point of 110° C. was used as the adhesive resin.

The results of evaluation of these bottles are shown in Table 1. The bottles FB, GB and HB were not substantially different from one another in the oxygen permeability, but the bottles FB and GB were excellent over the bottle HB in the haze and interlaminar peeling resistance.

TABLE 5

| Bottle | Oxygen Permeability (cc/m² · day · atm) | Haze (%) | Interlaminar Peeling (%) |
| --- | --- | --- | --- |
| FB | 4.2 | 9.5 | 2.0 |
| GB | 4.1 | 9.7 | 3.0 |
| HB | 4.3 | 16.8 | 100 |

What is claimed is:

1. A multi-layer drawn plastic vessel comprising at least one layer comprising at least one crystalline olefin resin selected from the group consisting of crystalline polypropylene and crystalline propylene/ethylene copolymers having an ethylene content of 1 to 20 mole %, at least one oxygen-barrier layer comprising an ethylene/vinyl alcohol copolymer having an ethylene content of 25 to 60 mole %, and an adhesive resin layer interposed between said two resin layers, said adhesive resin layer comprising an acid- or acid anhydride—modified, linear, low-density polyethylene and said crystalline olefin resin layer being molecularly oriented in at least one direction.

2. A vessel as set forth in claim 1, wherein the adhesive resin layer contains carbonyl groups derived from the acid or acid anhydride at a concentration of 1 to 600 meq/100 g of the polymer.

3. A vessel as set forth in claim 1, wherein the acid- or acid anhydride-modified, linear, low-density polyethylene has a density of 0.915 to 0.935 g/cm³ and a melt tension of 5 to 9 g as measured at 170° C.

4. A vessel as set forth in claim 1, wherein the acid- or acid anhydride-modified, linear, low-density polyethylene has a melting point of 115° to 135° C.

5. A multi-layer drawn plastic vessel comprising at least one layer comprising at least one crystalline olefin resin selected from the group consisting of crystalline polypropylene and crystalline propylene/ethylene copolymers having an ethylene content of 1 to 20 mole %, at least one oxygen-barrier layer comprising an ethylene/vinyl alcohol copolymer having an ethylene content of 25 to 60 mole %, and an adhesive layer interposed between said two resin layers, said adhesive layer comprising an acid- or acid anhydride-modified, linear, low-density polyethylene and an acid- or acid anhydride-modified propylene resin at a weight ratio of from 95/5 to 50/50 and said crystalline olefin resin layer being molecularly oriented in at least one direction.

6. A vessel as set forth in claim 5, wherein the weight ratio of the acid- or acid anhydride-modified, linear, low-density polyethylene to the acid- or acid anhydride-modified propylene is in the range of from 90/10 to 60/40.

7. A vessel as set forth in claim 5, wherein the acid- or acid anhydride-modified propylene resin contains carbonyl groups derived from the acid or acid anhydride at a concentration of 1 to 600 meq/100 g of the polymer.

8. A vessel as set forth in claim 5, wherein the acid- or acid anhydride-modified propylene resin has a melting point of 148° to 167° C.

* * * * *